Aug. 2, 1960 E. K. KARLSSON 2,947,131
EAR CORN CONVEYOR FOR CORN PICKERS
Filed July 22, 1958 4 Sheets-Sheet 1

INVENTOR.
Elof K. Karlsson
BY
Paul O. Pippel
Atty.

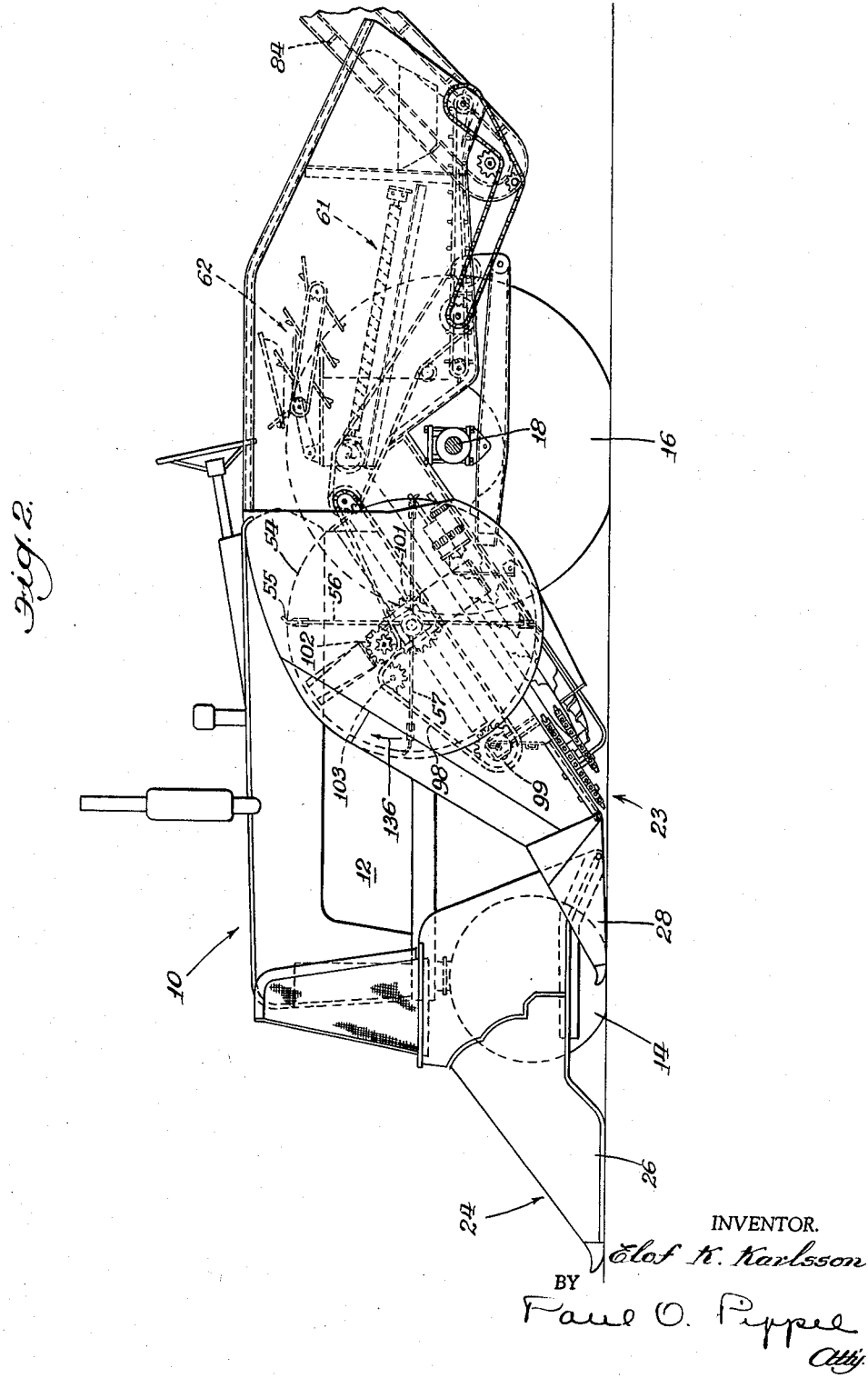

Aug. 2, 1960     E. K. KARLSSON     2,947,131
EAR CORN CONVEYOR FOR CORN PICKERS
Filed July 22, 1958     4 Sheets-Sheet 3
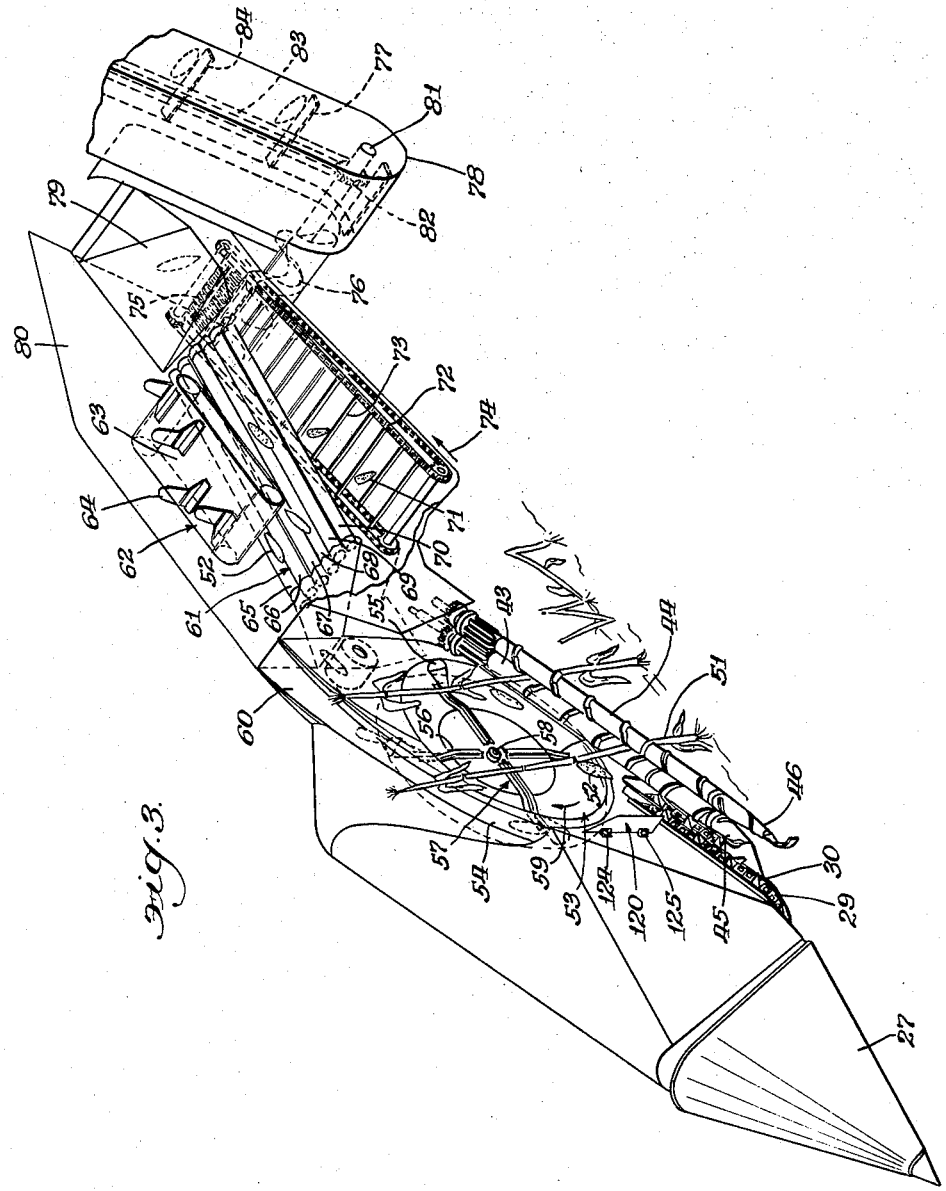
INVENTOR.
Elof K. Karlsson
BY
Paul O. Pippel
Atty.

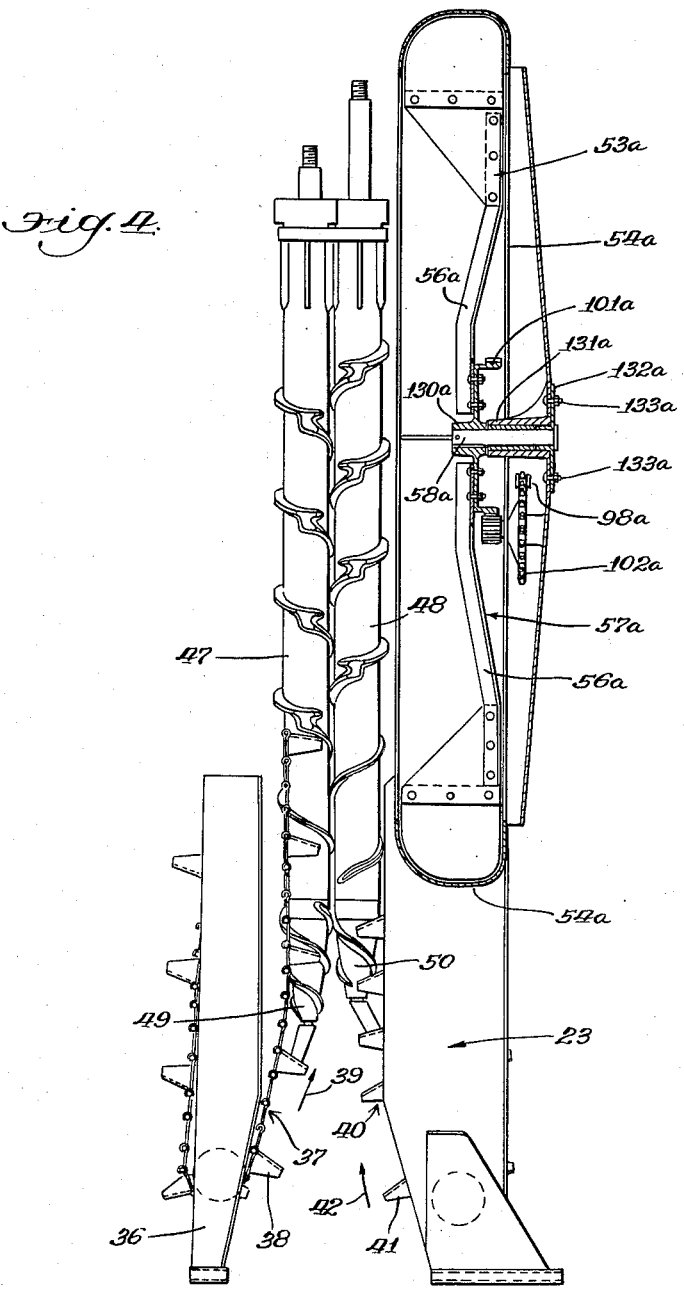

United States Patent Office 2,947,131
Patented Aug. 2, 1960

2,947,131

EAR CORN CONVEYOR FOR CORN PICKERS

Elof K. Karlsson, Moline, Ill., assignor to International Harvester Company, Chicago, Ill., a corporation of New Jersey Filed July 22, 1958, Ser. No. 750,133

6 Claims. (Cl. 56—18)

This invention relates to a new and improved ear corn conveyor for corn pickers.

Corn pickers as we now know them employ cooperative snapping rolls to effect the removal of ears from the stalks. Various means have been employed to convey the snapped ears of corn from their position on or adjacent to the snapping rolls to a further station or stations in the corn picker for subsequent treatment of the ears of corn. The removal of ears of corn from the vicinity of the snapping rolls is important to the successful snapping of ears of future corn admitted to the machine. The avoidance of congestion in this area is thus important to successful corn picker operations. Many types of conveyors have been positioned adjacent the snapping rolls to receive the snapped ears of corn and carry them upwardly and rearwardly in the corn picker for subsequent treating such as husking.

It is a principal object of this invention to provide mechanism in a corn picker of the type having downwardly and forwardly inclined snapping rolls for conveying the snapped ears of corn from the snapping rolls upwardly and rearwardly in the corn picker without directly carrying the ears of corn past the remaining portions of the cooperative snapping rolls.

Another important object of this invention is the provision of means in a corn picker for immediately removing ears of corn from the vicinity of the snapping rolls and conveying them to other parts of the corn picker for treatment thereon.

Another and further important object of this invention is to supply a corn picker of the type having downwardly and forwardly inclined cooperative snapping rolls with a "Ferris" wheel type of conveyor for immediately moving the snapped ears of corn from the snapping rolls up and over to a remote station on the corn picker.

Another and still further important object of this invention is to equip a corn picker with a "Ferris" wheel type of conveyor for receiving ears of corn from the snapping rolls as the corn falls downwardly and forwardly into the Ferris wheel and whereupon the rotation of the Ferris wheel in a direction up and over the snapping rolls causes the ears of corn to be delivered to a position rearwardly of the full length of the snapping rolls.

A still further important object of this invention is to provide means for conveying ears of corn snapped by downwardly and forwardly inclined snapping rolls from a position at the generally lower forward end of the snapping rolls to a position over and above the upper ends of the snapping rolls without passing the ears along the snapping rolls.

A still further important object of this invention is to supply a corn picker with corn elevating means therein to effectively deliver without congestion snapped ears of corn from the snapping rolls to the husking rolls.

Another important object of this invention is to supply a corn picker with corn elevating means which reduces to a minimum the distance between the snapping rolls and husking rolls which are disposed at a greatly different angularity with respect to the ground line than the snapping rolls.

A further object of this invention is to effectively shorten the distance between the snapping rolls and husking rolls to provide a much more compact corn picking unit.

Other and further important objects and advantages will become apparent from the disclosures in the following specification and accompanying drawings:

In the drawings:

Figure 2 is a side elevational view of the device of Figure 1 with portions thereof broken away to show interior construction;

Figure 3 is a perspective view of a portion of the corn picker of Figures 1 and 2 and particularly showing the interior thereof to follow the path of travel of the corn therethrough;

Figure 4 is an enlarged top plan view partially in section of the snapping rolls and car elevating wheel of this invention.

Figure 1:
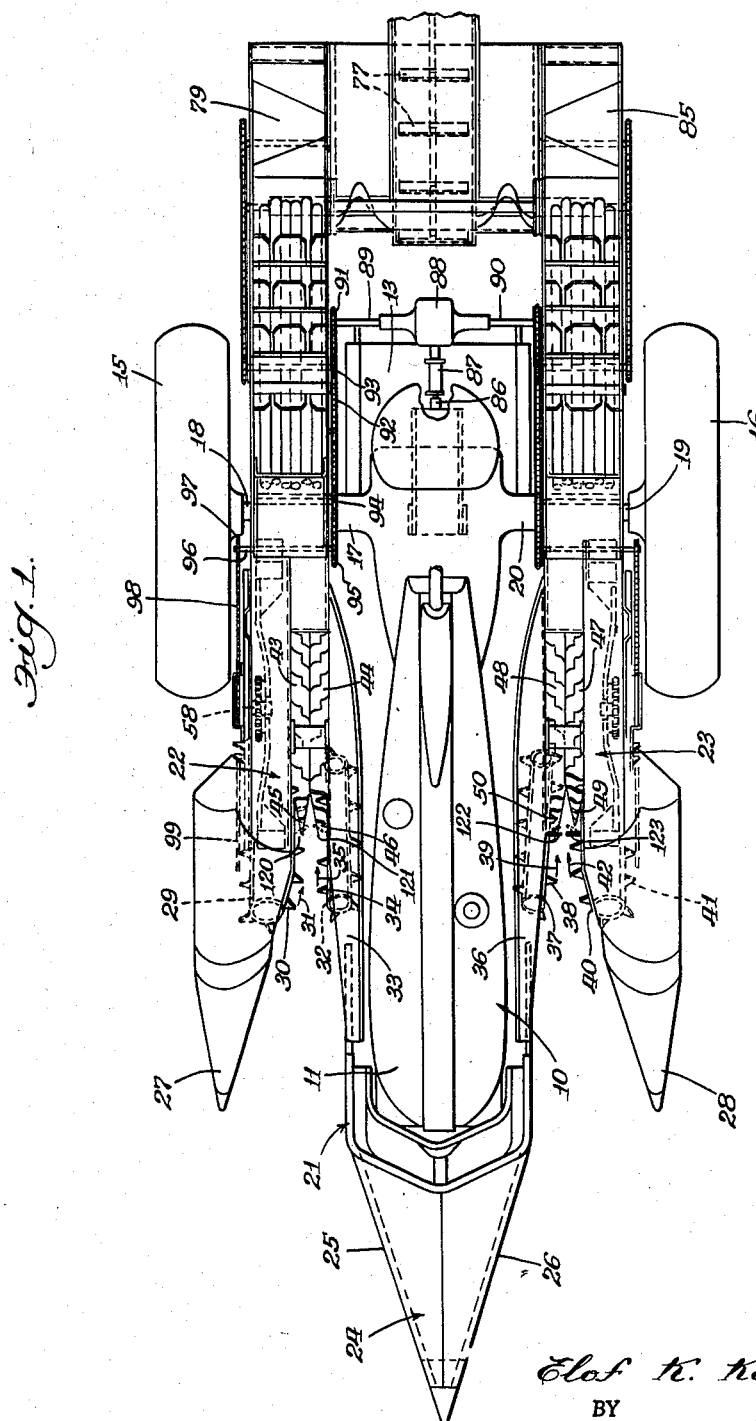
Figure 1 is a top plan view of the corn picker of this invention.

As shown in the drawings the reference numeral 10 indicates generally an agricultural type tractor on which the corn picker of this invention is mounted. The tractor 10 includes a generally longitudinally extending body portion 11 which consists of an engine 12 and a transmission and differential gear housing rearwardly thereof as shown at 13. The front part of the tractor body 11 is supported by steerable wheels 14 whereas the rearward part of the body 11 is carried on widely spaced apart large traction wheels 15 and 16. The corn picker of this invention is of the two row type and has one picking unit mounted between the widely spaced traction wheel 15 and the body 11 and another picking unit between the longitudinally extending body 11 and the widely spaced traction wheel 16. Thus the tractor is of the type to readily accommodate a two row picker for compact construction. The traction wheel 15 is mounted on a laterally extending housing 17 which carries an axle 18. Similarly the wheel 16 is carried on an axle 19 mounted in a laterally extending axle housing 20. The axle housings 17 and 20 are in alignment with each other and thus provide for the equal fore and aft positioning of the traction wheels 15 and 16.

The corn picker identified generally by the numeral 21 has a first picking unit 22 between the wheel 15 and the body 11 and a second picking unit 23 between the body 11 and the wheel 16. The wheels 14 of the tractor 10 and the body and engine 11 and 12 respectively have their front end shielded by what is known in the industry as a center divider 24. The center divider 24 is equipped with laterally and rearwardly inclined diverging surfaces 25 and 26 to cause the corn between the adjacent rows of corn to be deflected to either one side or the other and thence to the picking units 22 or 23. However, once divided the corn then remains on the selected side until the ears therefrom are completely harvested and subsequently treated by the picker of this invention. The picking unit 22 is provided with an outside divider 27 and similarly the picking unit 23 is provided with an outside row divider 28. Thus the corn is guided into the picking unit 22 by reason of the center divider 24 and its surface 25 in combination with the outside divider 27. Similarly the picking unit 23 has stalks of corn guided thereto and therethrough by reason of the center divider 24 and its angularly rearwardly inclined surface 26 in cooperation with the outside divider 28. The outside divider 27 has mounted therein a gathering chain 29 having outwardly extending lugs 30 to engage stalks of corn and deliver them in the direction of the arrow 31 as shown in Figure 1. A cooperative stalk gathering chain 32 is mounted in the center divider rearward extension 33 in such a manner that its outwardly projecting fingers 34 are substantially mating with respect to the fingers 30 of the gathering chain 29. The chain 32 runs rearwardly in the direction of the arrow 35 so that the cooperating inwardly projecting fingers 30 and 34 of the chains 29 and 32 respectively cause a cooperative rearward feeding of stalks into the gathering or corn pickup unit 22.

On the other side of the tractor body 11 a rearward extension 36 of the center divider 24 is comparable to the rearward extension 33 and houses a gathering chain 37 with outwardly projecting fingers 38. The chain 37 is adapted to be removed in the direction of the arrow 39 which is a generally rearward direction into the corn picking unit 23.

Another and cooperative gathering chain 40 is mounted in the outside divider 28 and has outwardly projecting stalk engaging fingers 41 which move in the direction of the arrow 42. Thus it will be seen that the inner cooperative faces of the gathering chains 37 and 40 both move rearwardly into the picking unit 23 to thus cooperatively feed stalks rearwardly into the corn picker.

The picking unit 22 is equipped with a pair of cooperative snapping rolls 43 and 44 which are inclined downwardly and forwardly between the outside divider 27 and the longitudinally extending tractor body 11. The forward ends of the rolls are tapered as shown at 45 and 46 and these tapered points are located at a position intermediate the gathering chains 29 and 32 and thus are capable of receiving and do receive the standing stalks of corn from the inwardly projecting fingers 30 and 34 of the gathering chains 29 and 32.

A comparable pair of cooperative snapping rolls 47 and 48 have forwardly tapering points 49 and 50 to receive standing stalks of corn from the cooperative gathering chains 37 and 40 with their outwardly projecting fingers 38 and 41 respectively.

As best shown in Figure 3 the corn stalks 51 growing in a row in a field of standing corn are adapted to be guided into the throat formed between the center divider 24 and the outside divider 27. From that point the stalks are then engaged by the inwardly and oppositely projecting stalk engaging fingers 30 and 34 to cause a feeding of the stalks to the tapered forward ends 45 and 46 of the cooperative corn snapping rolls 43 and 44. The snapping rolls or ear stripping rolls as they are sometimes called rotate downwardly and inwardly on their adjoining surfaces so that the stalks 51 are pulled down through the rolls and the ears 52 thereon approaching the juncture between the rolls are finally stripped from the stalks 51 as shown in Figure 3 whereupon the snapped and stripped ears fall laterally to the outside of the snapping rolls 43 and 44 into a large "Ferris" wheel type of conveyor 53 which lies adjacent thereto and within a housing 54 formed in the gathering unit 22. The units 22 and 23 are symmetrically constructed and inasmuch as Figure 3 shows the unit 22 and Figure 4 the unit 23 the description thereof will be combined. In certain instances parts will be shown in one view and not the other. The basic reference numerals shall be the whole numbers while the showing of the unit 23 in Figure 4 will be the same numerals with an "a" suffix.

As best shown in Figure 4 the housing 54a is circular in shape to snugly receive the wheel 53a for rotation therein. The wheel is used to raise ears of corn severed by the snapping rolls to a distant position in the machine where further treatment occurs. The wheels includes radially extending paddles 55a which as shown in Figure 4 conform closely to the internal shape of the housing 54a. The paddles are attached to the outer ends of the ribs 56a which have a shaft journalling hub 130a formed in the center thereof. The ribs 56a combine to form a wheel spider 57a with radially projecting spokes to which the paddles 55a are attached. A shaft 58a journally received in the hub 130a and it should be under- stood the corn conveying wheel is rotated about this shaft in the direction of the arrow 59. The shaft 58a is supported in a bearing 131a which is equipped with an annular flange 132a for fixedly attaching the bearing by means of bolts or the like 133a to a part of the housing of unit 23. The bearing 131a is in axial alignment with and abuts the wheel hub 130a.

Thus as viewed in both of Figures 3 and 4 the ears of corn 52 severed from the stalks drop downwardly and forwardly into the housing 54 whereupon the paddles 55 pick up these ears and carry them up and over the top of the wheel 53 within the housing 54 to a point of discharge at the rear of the snapping rolls. This is an ear corn elevator in a picker which does not drag the severed ears past the snapping rolls to interfere with the subsequent snapping of ears from stalks. The rearward end of the housing 54 is provided with a discharge spout 60 through which ears of corn are dropped to fall on the forward end of a corn husking bed 61. The ears of corn 52 are pitched rearwardly onto the husking bed 61 immediately following their snapping from the stalks. There is thus a minimum of congestion in the removal of ears from the snapping rolls to always maintain clean unclogged rolls for the snapping of succeeding ears of corn. It should be noted that the Ferris wheel type of conveyor does not attempt to drag the ears of corn up alongside the remaining portions of the snapping rolls, but rather the ears are permitted to drop forwardly and downwardly into the wheel type lift following which the ears are thrown up and over the top and out the discharge spout 60 in a trajectory which permits them to fall onto the husking bed 61.

A feeder type of conveyor 62 is disposed over the husking bed 61 and is adapted to feed ears 52 longitudinally thereover. The conveyor 62 includes an endless belt member 63 and outwardly projecting paddles 64 at various positions over the surface thereof. The paddles 64 are adapted to move rearwardly on the underside of the endless belt 63 and thereupon move the ears of corn 52 rearwardly over the plurality of cooperative pairs of husking rolls 65 and 66, 67 and 68, and 69 and 70 which together comprise the husking bed 61. Each pair of rolls turns downwardly and inwardly along their adjoining edges to cause the husks on the ears 52 to be stripped therefrom. The husks 71 fall through the bed 61 and drop onto a chain conveyor 72 having a plurality of cross slats 73 thereon. The conveyor 72 is adapted to have its lower flight move rearwardly in the direction of the arrow 74 whereupon husks 71 will be carried to a rear point of the corn picker for discharge out the end thereof. A fingerlike grate is provided at substantially the rear of the conveyor 72 as shown at 75 and permits the dislodging of any kernels which might be carried by the husks. The kernels fall downwardly through the grate 74 into a transversely disposed auger conveyor 76. This auger conveyor 76 also carries the ears of corn husked by the purality of husking rolls in the bed 61 laterally to an upwardly and rearwardly inclined wagon elevator 77 mounted within a housing 78. An inclined chute or deflector member 79 is attached to the side sheet member 80 and projects laterally therefrom to a position beyond the side of the slatted chain conveyor 72 and disposed over the transversely disposed auger conveyor 76 whereby the ears of corn will not fall onto the husk discharge conveyor 72 but rather will pass thereover and drop into the auger conveyor 76 so that the ear corn combines with the shelled corn for transverse delivery to the wagon elevator 77. The wagon elevator 77 includes a shaft 81 on which the auger conveyor 76 is mounted. The shaft also has a sprocket 82 affixed thereto to drive a chain or the like 83. Slats 84 are provided on the chain 83 at spaced intervals therearound. Both shelled and ear corn are moved laterally through the side of the housing 78 whereupon the slats 84 sweep downwardly and pick up the corn and move it up against the bottom of the housing 78 for eventual discharge at the rear and upper end thereof over a trailing wagon or the like. As best shown in Figure 1 the wagon elevator 77 is adapted to receive harvested corn from both picking units 22 and 23. In the same manner as the deflector 79 causes ear corn to be delivered downwardly and laterally over the husk conveyor to the transversely disposed auger conveyor 76 there is employed a similar deflector member 85 at the end of the picking unit 23 to cause the ear corn to bridge over the husk conveyor disposed therebeneath and drop the ear corn into the transversely disposed auger 76 to thereupon combine with the previously deposited shelled corn therein.

The tractor 10 is equipped with a power take-off shaft 86 at the rear thereof as shown in Figure 1. Shaft extension means 87 is attached to the power take-off shaft 86 and delivers rotational power to a gear box 88. The rotational drive is thereupon delivered transversely through shafts 89 and 90 for delivering power to the picking units 22 and 23 respectively. A sprocket 91 on the shaft 89 drives a chain 92 which extends around a plurality of sprockets 93, 94 and 95. The sprocket 95 is mounted on a jackshaft 96 which has mounted on its other end a sprocket 97 for driving a chain 98. A sprocket 99 is mounted on a shaft 100. A gear 101 is mounted on the shaft 58 and is offset laterally from planar alignment with the sprockets 97 and 99 which receive and have the chain 98 positioned thereover. Further there is provided idler sprockets 102 and 103 about which the chain 98 is also draped. The idler sprocket 102 has a relatively small diameter toothed gear portion 135 which engages the gear 101. The driving of the chain 98 thus causes a rotating of the Ferris wheel 53 in a manner and in the direction of the arrow 136 to elevate ears of corn to the husking bed 61.

In the operation of the machine of this invention it is propelled through a field of standing corn in such a manner that adjacent rows of corn are fed to the picking units 22 and 23 on each side of the tractor 10. As best shown in Figure 1 and as previously described, the corn stalks are guided into the picking units by reason of the center divider member 24 with its oppositely inclined walls 25 and 26 and the cooperative outside divider points 27 and 28. The stalks are then grasped by the gathering chains causing the butt ends of the stalks to be positively delivered to the forward lower ends of the cooperative snapping rolls. The snapping rolls rotate inwardly and downwardly to thereupon pull the stalks therethrough. When the ears are stripped from the stalks they drop loosely on top of the rolls and thence fall laterally as previously discussed into the Ferris wheel elevator. However, in order to avoid losing the ears should they drop or fall directly forwardly down the surface of the rolls there is provided one way swinging gates 120 and 121. The gates 120 and 121 are disposed over the snapping rolls 43 and 44 for the picking unit 22 and similarly gates 122 and 123 are disposed over the cooperative snapping rolls 47 and 48 of the picking unit 23. The gate 120 is shown in detail in Figure 3 and is provided with hinges 124 and 125 at the outside thereof which are arranged and constructed to permit the gate 120 to swing rearwardly and thereby permit entrance of stalks into the area of the snapping rolls 43 and 44 adjacent the Ferris wheel elevator 53. The hinges 124 and 125 are also so arranged as to prevent return swinging movement of the gate 120 beyond the right angle position thereof as shown in Figure 3 whereby ears of corn which are severed from the stalks and are not yet confined within the Ferris wheel elevator 53 are barred from falling out forwardly from the picking units. Thus the purpose of the gates 120, 121, 122 and 123 is to retain the snapped ears of corn until such time as they are picked up by the Ferris wheel and deposited rearwardly on the husking beds 61. Spring means are incorporated in the hinges 124 and 125 of the gate 120 and similarly the hinges of the other gates 121, 122 and 123 to normally urge the gates into right angle position with respect to their mountings to normally retain the gates in the position as shown in Figure 1 wherein ears of corn which are snapped by the snapping rollers are not permitted to drop out of the machine. However, on the entrance of the stalks into the snapping rolls the gates will yield rearwardly as shown in the dash line positions thereof in Figure 1 to permit the stalks to get to the inner side whereupon the gates swing forwardly to their chamber enclosing position.

It is apparent that herein is provided a corn picking machine which will effectively receive all of the stalks fed thereto and retain possession of the ears as they are snapped with a minimum of congestion and deliver them up and over the top of the snapping rolls onto the husking bed whereafter the ears are husked and deposited in the wagon elevator for delivery to a trailing wagon or the like.

Various details of construction may be changed throughout a wide range without departing from the principles disclosed herein and we therefore do not propose limiting the patent granted hereon otherwise than as necessitated by the appended claims.

What is claimed is:

1. In a corn picker of the type having downwardly and forwardly inclined snapping rolls and an elevator arranged and constructed to receive ears of corn from and snapped by the snapping rolls and convey them rearwardly in the corn picker, said elevator comprising a wheel mounted on a transverse axis and disposed laterally adjacent said snapping rolls, said wheel having at least one generally transversely disposed paddle thereon arranged to receive ears of corn from said snapping rolls as the ears of corn fall by gravity forwardly and laterally into said paddle to thereupon clear said snapping rolls of corn, and means rotating said wheel forwardly and thence upwardly to throw ears of corn from a position adjacent the lower forward ends of the snapping rolls upwardly and rearwardly in the corn picker to a position over the snapping rolls.

2. A device as set forth in claim 1 in which said wheel includes a disc spaced outwardly from said snapping rolls and said paddle projecting inwardly from said disc to terminate closely adjacent said snapping rolls.

3. A device as set forth in claim 2 in which said wheel further includes cross ribs on said disc and a radially extending paddle on the outer end of each of said cross ribs.

4. A device as set forth in claim 1 in which said corn picker includes means to prevent the loss of snapped ears from said picker forwardly down the inclined snapping rolls.

5. A device as set forth in claim 4 in which said means to prevent loss of snapped ears includes one-way swinging spring extended gates disposed over the snapping rolls at a generally forward location.

6. A device as set forth in claim 1 in which said corn picker includes a housing enclosing said wheel and terminating in a discharge spout at the upper and rearward end through which ears of corn may be propelled by the wheel paddle.

References Cited in the file of this patent

UNITED STATES PATENTS

| | | |
|---|---|---|
| 1,808,855 | Matoushek | June 9, 1931 |
| 2,676,450 | Schaaf et al. | Apr. 27, 1954 |
| 2,700,858 | Bulfer | Feb. 1, 1955 |
| 2,701,942 | Caldwell et al. | Feb. 15, 1955 |
| 2,843,991 | Poehls | July 22, 1958 |